(12) United States Patent
Betz et al.

(10) Patent No.: US 10,279,773 B2
(45) Date of Patent: May 7, 2019

(54) BELT-TENSIONER CABLE-GUIDING PART, AND BELT TENSIONER

(71) Applicant: TRW AUTOMOTIVE CMBH, Alfdorf (DE)

(72) Inventors: Hans-Peter Betz, Böbingen (DE); Dominik Seitzer, Waldstetten (DE)

(73) Assignee: TRW Automotive GmbH, Alfdorf (DE)

( * ) Notice: Subject to any disclaimer, the term of this patent is extended or adjusted under 35 U.S.C. 154(b) by 79 days.

(21) Appl. No.: 15/305,693

(22) PCT Filed: May 12, 2014

(86) PCT No.: PCT/EP2014/001270
§ 371 (c)(1),
(2) Date: Oct. 21, 2016

(87) PCT Pub. No.: WO2015/172793
PCT Pub. Date: Nov. 19, 2015

(65) Prior Publication Data
US 2017/0057460 A1    Mar. 2, 2017

(51) Int. Cl.
*B60R 22/195* (2006.01)
*B60R 22/46* (2006.01)

(52) U.S. Cl.
CPC ...... *B60R 22/1952* (2013.01); *B60R 22/1954* (2013.01); *B60R 22/4619* (2013.01)

(58) Field of Classification Search
CPC ............ B60R 22/1952; B60R 22/1954; B60R 22/4619
See application file for complete search history.

(56) References Cited

U.S. PATENT DOCUMENTS

| 5,887,897 | A | 3/1999 | Gill et al. | |
|---|---|---|---|---|
| 5,897,140 | A * | 4/1999 | Wier | B60R 22/1952 280/806 |
| 2002/0030396 | A1* | 3/2002 | Stevens | B60R 22/4628 297/480 |
| 2003/0122362 | A1 | 7/2003 | Ukita et al. | |
| 2004/0256850 | A1* | 12/2004 | Yamaguchi | B60R 22/195 280/806 |
| 2004/0259672 | A1* | 12/2004 | Betz | B21C 37/294 474/101 |
| 2009/0115179 | A1 | 5/2009 | Zasu et al. | |
| 2011/0068614 | A1 | 3/2011 | Sugiyama et al. | |
| 2015/0027337 | A1* | 1/2015 | Betz | B60R 22/4628 102/530 |

(Continued)

FOREIGN PATENT DOCUMENTS

DE    102011117056 A1 * 5/2013 ......... B60R 22/4633

*Primary Examiner* — James A English
(74) *Attorney, Agent, or Firm* — Tarolli, Sundheim, Covell & Tummino LLP

(57) ABSTRACT

On a belt tensioner cable guide member (10) comprising a guide duct (42) for a cable of a belt tensioner and comprising a pressure duct (40) for fluid communication between an inflator and a pressure chamber to which a displacement body to be driven and being coupled to the cable is assigned, a first sealing element (44) sealing the guide duct (42) against the cable and especially enclosing the cable in the peripheral direction is provided within the guide duct (42).

12 Claims, 4 Drawing Sheets

(56) References Cited

U.S. PATENT DOCUMENTS

2015/0028652 A1\* 1/2015 Betz ................... B60R 22/4633
    297/480
2015/0336539 A1\* 11/2015 Gray .................. B60R 22/4628
    242/389
2016/0368451 A1\* 12/2016 Kacprzak ........... B60R 22/1952

\* cited by examiner

BELT-TENSIONER CABLE-GUIDING PART, AND BELT TENSIONER

RELATED APPLICATIONS

This application corresponds to PCT/EP2014/001270, filed May 12, 2014, the subject matter of which is incorporated herein by reference in its entirety.

BACKGROUND OF THE INVENTION

The invention relates to a belt tensioner cable guide member comprising a guide duct for a cable of a belt tensioner and a pressure duct for fluid communication between an inflator and a pressure chamber to which a displacement body to be driven and being coupled to the cable is assigned. The invention moreover relates to a belt tensioner for a seat belt in a vehicle.

Belt tensioners for a seat belt in a vehicle include a pressure chamber in which a displacement body, for example a piston, is movably supported in the longitudinal direction of the pressure chamber. Said displacement body is coupled to a cable to which a component of the seat belt, for example a belt buckle or an end fitting, is connected. When the displacement body is moved in the longitudinal direction within the pressure chamber, the cable and hence the component of the seat belt is withdrawn and the seat belt retained thereon is tensioned. In order to move the displacement body within the pressure chamber an inflator is provided which is in fluid communication with the pressure chamber. The fluid leaving the inflater generates in the pressure chamber excess pressure by which the displacement body is moved in the longitudinal direction of the pressure chamber.

A belt tensioner of this type includes a belt tensioner cable guide member to which the pressure chamber end the inflator are connected. The cable is guided out of the pressure chamber through a guide duct provided in the belt tensioner cable guide member. Furthermore, the belt tensioner cable guide member includes a pressure duct that establishes fluid communication between the inflator and the pressure chamber so that the fluid leaving the inflator may enter into the pressure chamber.

SUMMARY OF THE INVENTION

It is the object of the invention to provide a belt tensioner cable guide member which ensures improved tensioning performance. It is a further object of the invention to provide an appropriately improved belt tensioner.

In order to achieve the object in a belt tensioner cable guide member of the type mentioned in the beginning a first sealing element is provided in a guide duct for sealing the guide duct against the cable and especially encloses the cable in the circumferential direction. For this purpose, the inner diameter of the sealing element is preferably smaller than the outer diameter of the cable so that the sealing element is adjacent to the cable in the circumferential direction so that the fluid flowing into the inflator through the pressure duct is prevented from flowing out of the pressure duct through the guide duct.

The belt tensioner cable guide member may include a support member consisting of a first plastic material and defining the shape of said member, thus allowing the belt tensioner cable guide member to have a very light-weight design. In particular, a fiber-reinforced plastic material can be used by which high strength of the support member and thus of the belt tensioner cable guide member can be obtained while maintaining a low weight.

The first sealing element is hose-shaped, for example, and is made of elastic material, with the sealing element being retained in the support member by adhesive bonding and/or by form closure. The sealing element may be arranged in a groove within the guide duct.

It is also possible, however, that the sealing element and the support member are manufactured in a two-component injection molding process which interconnects them by adhesive bonding. The hose shape enables a preferably long sealed distance to be formed so that reliable sealing of the guide duct against the cable is obtained.

The sealing element may include at least one sealing lip having a reduced diameter which is provided especially at an axial end of the sealing element. The diameter of said sealing lip is reduced so that the sealing lip is in peripheral contact with the cable and thus ensures proper sealing of the guide duct against the cable, even if the pressure increases in the pressure chamber. The sealing effect can be influenced by the shape and the inner diameter of the sealing lip or by selecting an appropriate material.

The belt tensioner cable guide member preferably includes a connecting end for the pressure chamber to which the latter can be tightly connected. The belt tensioner cable guide member includes a second sealing element at said connecting end so as to reliably seal the pressure chamber against the belt tensioner cable guide member. The pressure duct and the guide duct open into said connecting end. The pressure chamber may be manufactured separately from the belt tensioner cable guide member and may be easily connected to the fatter via the connecting end, wherein reliable sealing of the pressure chamber against the belt tensioner cable guide member can be provided by the second sealing element.

The cable guide member may be designed as an end-face plug for closing the pressure chamber.

The belt tensioner cable guide member may further include a port for an inflator to be mounted which is adapted to provide pressurized fluid. The pressure duct establishing a fluid communication between the inflator and the pressure chamber opens into said port so that the inflator can be mounted tightly on the port Thus a completely modular structure of the belt tensioner is possible.

The run of the pressure duct inside the belt tensioner cable guide member can be adapted at will to the position of the pod for the inflator and of the connecting end for the pressure chamber. The pressure duel may open into the pressure chamber while in portions extending in parallel to the guide duel so that the fluid flows into the pressure chamber in the longitudinal direction.

The arrangement of the port for the inflator and of the connecting end for the pressure chamber may be varied at will so as to make ideal use of the space available in a vehicle. The port for the inflator and the connecting end for the pressure chamber are arranged at right angles relative to each other, for example, so that they do not mutually obstruct each other during assembly. Especially the port for the pressure chamber is arranged in the direction of the guide duct so that the cable is drawn in the direction of the guide duct and no deflection of the cable within the belt tensioner cable guide member is required.

Preferably, in the area of the port for the inflator a third sealing element, especially a seal ring, is provided for sealing the inflator against the port and, resp., against the belt tensioner cable guide member.

The belt tensioner cable guide member may be a multi-component injection molded part and at least one sealing element may be attached by injection-molding. This enables simple manufacture of the belt tensioner cable guide member, in addition, by such manufacturing method the sealing elements may be fastened to the support member by adhesive bonding and/or by form closure so that a safe connection is established therebetween.

In accordance with the invention, furthermore a belt tensioner for a seat belt is provided in a vehicle comprising a belt tensioner cable guide member according to the invention, an inflator for providing a pressurized fluid, a pressure chamber being in fluid communication with the inflator and being connected at the associated connection end of the belt tensioner cable guide member in a sealing manner and comprising a cable connected to a displacement body movably supported in the pressure chamber to which displacement body the pressurized fluid can be applied in a tensioning direction, wherein the first sealing element seals the guide duct against the cable.

The inflator may include a metal pipe, for example, which is mounted especially on a port at the belt tensioner cable guide member.

BRIEF DESCRIPTION OF THE DRAWINGS

Further advantages and features will be evident from the following description in connection with the enclosed drawings, in which.

DESCRIPTION

Figure 1:
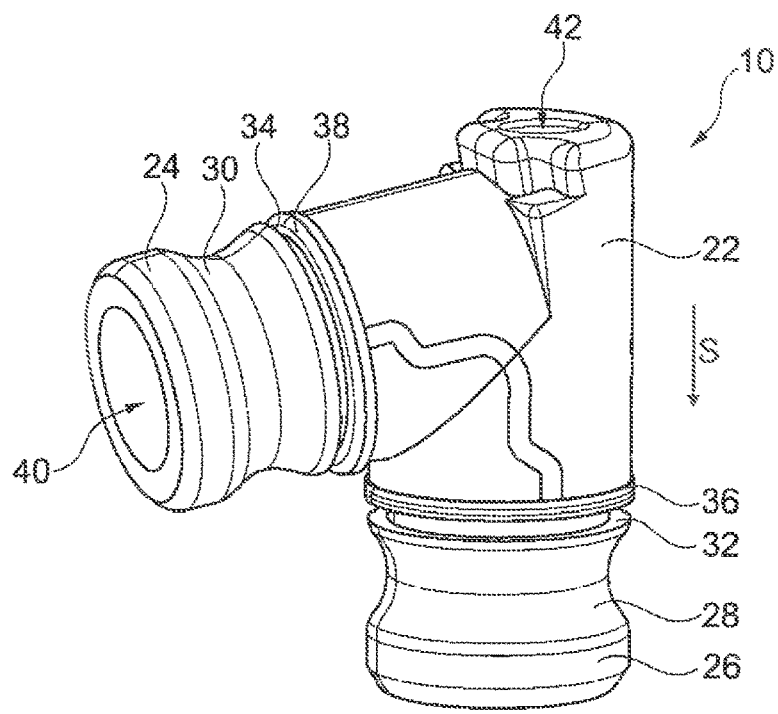
FIG. 1 shows a first perspective view of a belt tensioner cable guide member according to the invention.
Figure 2:
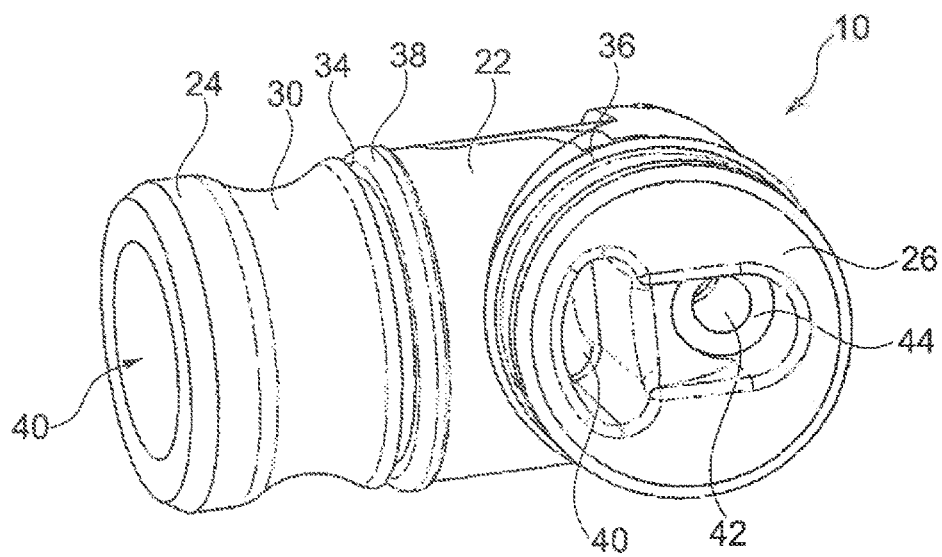
FIG. 2 shows a second perspective view of the bell tensioner cable guide member of FIG. 1.
Figure 3:
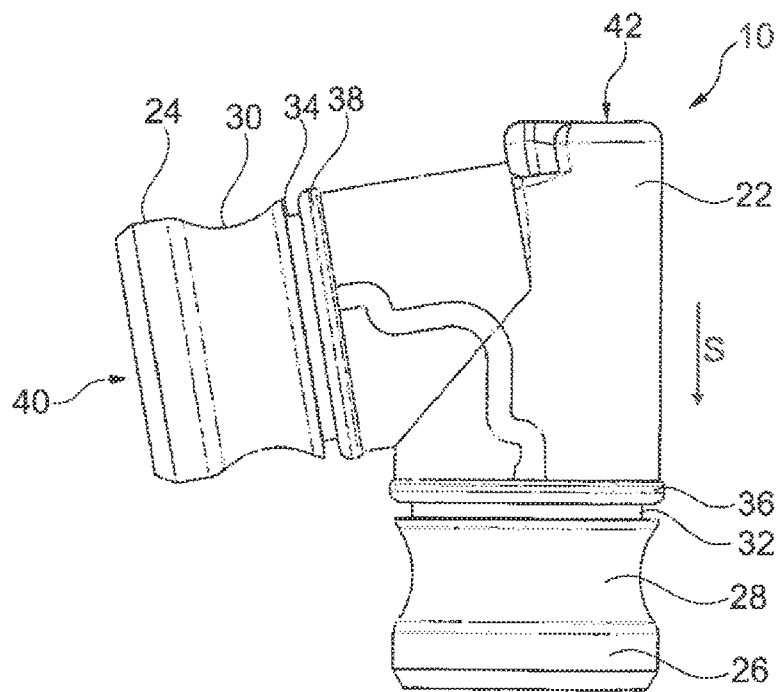
FIG. 3 shows a side view of the belt tensioner cable guide member of FIG. 1.
Figure 4:
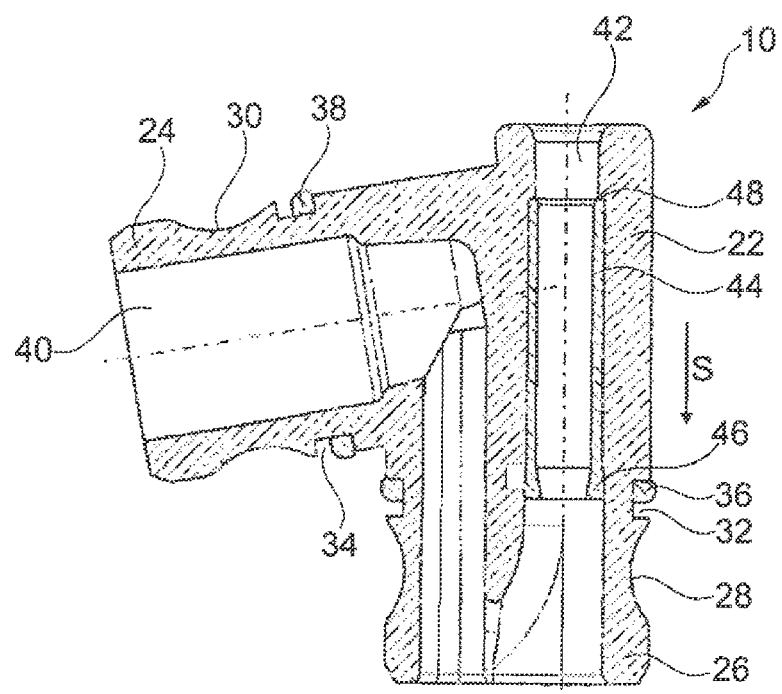
FIG. 4 shows a sectional view across the belt tensioner cable member of FIG. 1.
Figure 5:
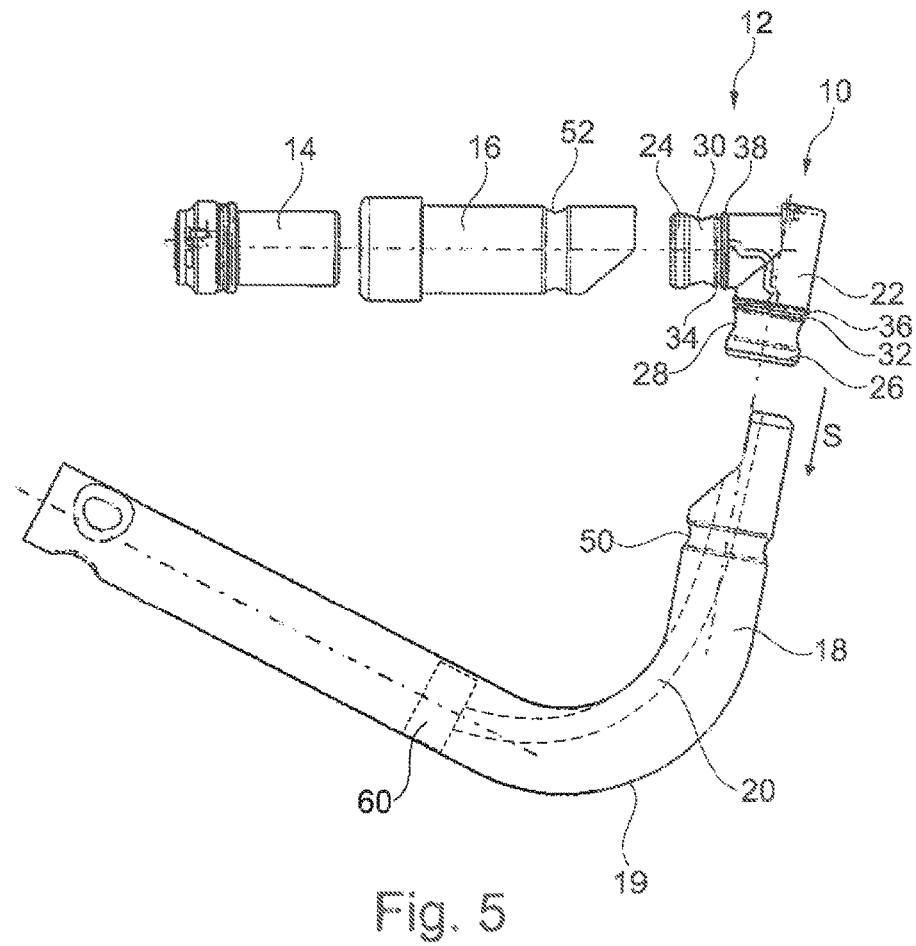
FIG. 5 shows an exploded view of a belt tensioner according to the invention.
Figure 6:
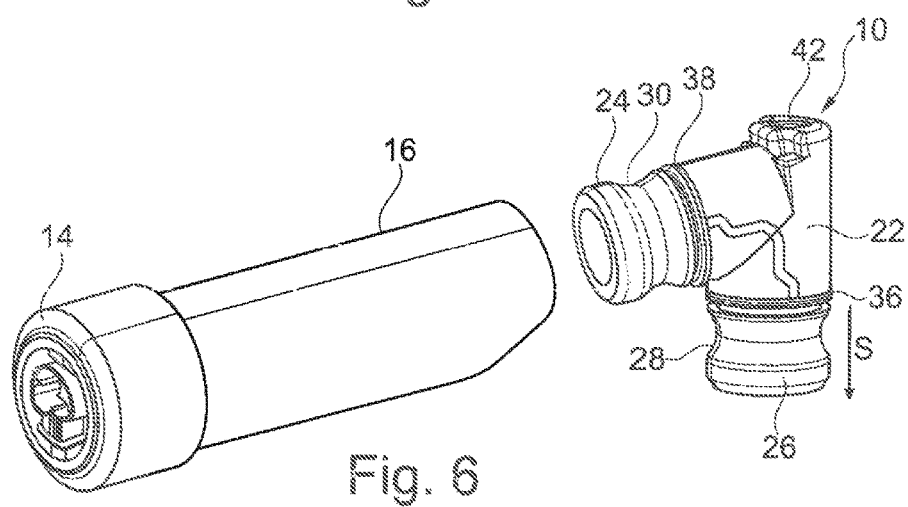
FIG. 6 shows a first mounting step of the belt tensioner of FIG. 5.
Figure 7:
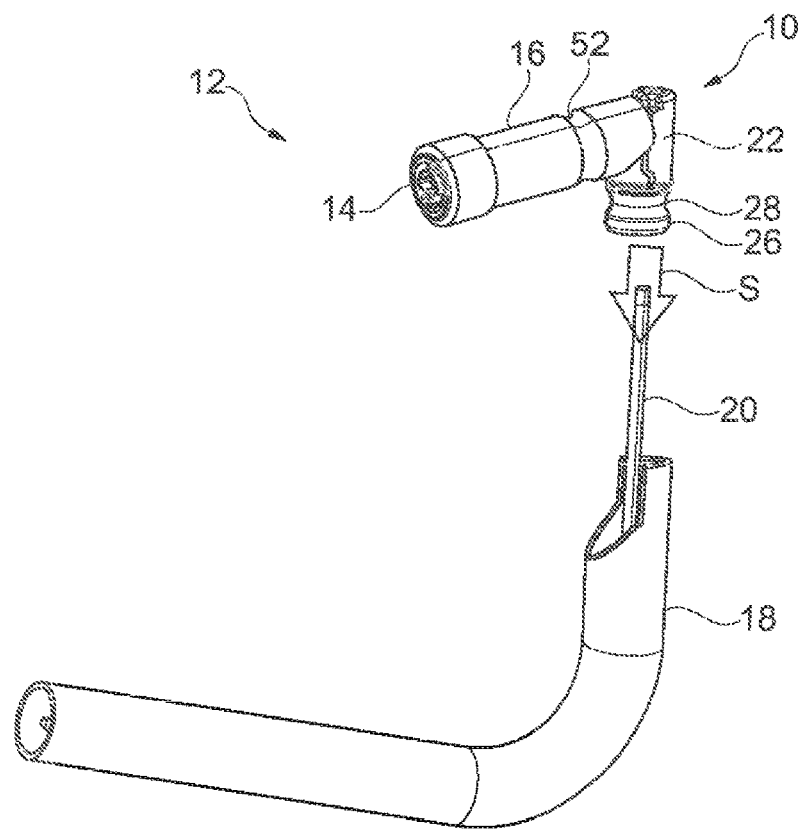
FIG. 7 shows a second mounting stop of the bed tensioner of FIG. 6.

In FIGS. 1 through 4 a belt tensioner cable guide member 10 for a belt tensioner 12 illustrated in FIGS. 5 to 7 is shown.

The belt tensioner 12 includes an inflator 14 arranged in the embodiment shown here within a pipe length 16 which is connected to the belt tensioner cable guide member 10 as well as a pressure chamber 13 formed by a pipe 19 designed to be curved in this embodiment in the pressure chamber 18 a displacement body 60 coupled to a cable 20 is provided. For this purpose, the pipe 19 is connected to the cable guide member 10 on the sloe of the latter facing away from the inflator 14. The cable guide member is inserted into an and of each of the pipe 19 and of the pipe length 16 connected to the inflator.

The free end of the cable 20 projecting from the belt tensioner 12 is fastened to a component of a seat belt, for example on an end fitting or a belt buckle.

The belt tensioner cable guide member 10, on the one hand, serves as a connecting piece between the inflator 14 and the pressure chamber 18 so that the fluid may flow from the inflator 14 into the pressure chamber 18. On the other band, the belt tensioner cable guide member 10 serves as a guideway through which the cable 20 is guided out of the pressure chamber 18.

As is evident from FIGS. 1 to 4, the belt tensioner cable guide member 10 comprises a support member 22 at which a port 24 for the inflator 14 as well as a connecting end 26 for the pressure chamber 18 are provided.

The support member 22 is made of plastic material. Preferably a fiber-reinforced plastic is used as plastic material.

Both the port 24 and the connecting end 26 are configured as seats to which the pipe length 16 in which the inflator 14 is inserted and, resp., the pipe 19 can be attached and fixed.

Each of the connecting end 28 and the port 24 includes a recess 28, 30 peripheral in the peripheral direction for positively mounting the inflator 14 and the pressure chamber 18. Moreover, respective peripheral grooves 32, 34 are provided, in the groove 32 of the connecting end 26 a second sealing element 36 is provided and in the groove 34 at the port a third sealing element 38 is provided. Both sealing elements 38, 38 are configured as seal rings.

In the embodiment shown here the port 24 for the inflator 14 is arranged substantially at right angles with the connecting end 26 for the pressure chamber 18. On the one hand, this allows a space-saving arrangement of the assembled belt tensioner 12 inside the vehicle. On the other hand, the port 24 and the connecting end 26 are within perfect reach so that sufficient working space is available for mounting the inflator 14 and the pressure chamber 18. The inflator 14 and the pressure chamber 18 in this way can be mounted separately from each other on the belt tensioner cable guide member 10 (FIGS. 6 and 7).

Depending on the mounting conditions, a different arrangement of the inflator 14 is possible, however, it has merely to be ensured that a fluid communication between the inflator 14 and the pressure chamber 18 can be established via the belt tensioner cable guide member 10.

As is evident especially from FIG. 4, the support member 22 comprises a pressure duct 40 which establishes a fluid communication between the port 24 and the connecting end 26, viz. between the inflator 14 and the pressure chamber 18.

There is further provided a guide duct 42 which extends in the tensioning direction S through the belt tensioner cable guide member 10 and through which the cable 20 is guided in the tensioning direction S (see FIG. 7).

As is visible in FIG. 4, the pressure duct 40 is configured to be bent, with the end of the pressure duct 40 opening into the pressure chamber 18 extending substantially in parallel to the guide duct 42, viz. in the tensioning direction S.

In the guide duct 42 a first sealing element 44 is provided which seals the guide duct 42 against the cable 20.

Upon activation of the inflator 14 the fluid exiting the inflator 14 flows through the pressure duct 40 of the belt tensioner cable guide member 10 into the pressure chamber 18 and pressurizes the displacement body in the tensioning direction S. The cable 20 coupled to the displacement body 60 is equally pressurized in the tensioning direction S, thus causing an end fitting fastened to the cable 20 or a belt buckle to be moved in the tensioning direction S and the seat belt retained at the end fitting or at the belt buckle to be tensioned.

The first sealing element 44 encloses the cable 20 in the peripheral direction and seals the guide duct 42 against the cable 20 so that the fluid flowing into the pressure chamber 18 cannot escape from the same.

In the embodiment shown here the first sealing element 44 is hose-shaped so that an as long sealing stretch as possible is formed between the cable 20 and the sealing element 38.

At the axial end forward in the tensioning direction S, i.e. facing the pressure chamber 18, the first sealing element 44 includes a sealing lip 46 having an inner diameter which is reduced vis-à-vis the residual first sealing element 44 and which additionally ensures an improved sealing. The inner diameter of the first sealing element 44 is selected independently thereof so that the first sealing element 44 is in sealing contact with the cable 20 in the circumferential direction, i.e. the inner diameter is equal to or smaller than the outer diameter of the cable 20.

On the outer side, the first sealing element 44 in the embodiment illustrated here is positively retained in the support member 22 of the belt tensioner cable guide member 10. For this purpose, in the guide duct 42 a step 48 is formed to which the first sealing element 44 is adjacent against the tensioning direction S. Upon increase of the pressure in the pressure chamber 18, said pressure urges the first sealing element 44 against the tensioning direction S in the guide duct 42.

The step 48 reliably prevents the first sealing element 44 from being forced out of the guide duct 42. Instead of such step 48, also a groove may be provided, for example, in which the first sealing element 44 is positively held.

It is also possible, however, that the first sealing element 44 is held in the guide duct 42 by adhesive bonding and is especially injected in the same. The belt tensioner cable guide member 10 is manufactured, for instance, in a two-component injection molding process so that an adhesive and/or positive connection is established between the belt tensioner cable guide member 10 and, resp., the support member 22 of the belt tensioner cable guide member 10 and the sealing element 44, preferably all sealing elements 38, 38, 44.

Independently of the fixation and manufacture of the first sealing element 44 in the guide duct 42 the first sealing element 44 may also take a different shape and may be configured as a seal ring, for example. Also the position of the sealing lip 46 may be varied at will.

It has to be ensured that the first sealing element 44 is safely retained in the support member 22, for example by gluing, injection molding or a positive connection, and that a reliable sealing of the guide duct 42 against the cable 20 is performed by the first sealing element 44.

The guide duct 42 extends preferably linearly so that the cable 20 is not deflected by the belt tensioner cable guide member 10. It is also possible, however, that a deflection of the cable is provided at the belt tensioner cable guide member 10.

Of preference, the section of the pressure duct 40 opening info the pressure chamber 18 is orientated in the tensioning direction S so that fluid flowing info the pressure chamber 18 may act directly on the displacement body in the tensioning direction S.

Figure 8:
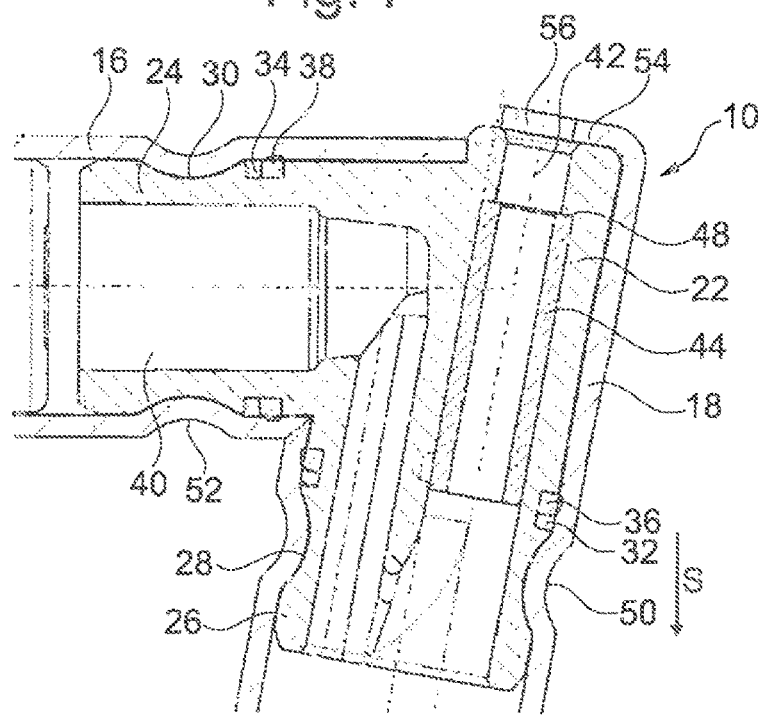
FIG. 8 shows a sectional view across a second embodiment of a belt tensioner cable guide member according to the invention including an inflator and a pressure chamber mounted thereon.

In FIG. 8 a second embodiment of a belt tensioner cable guide member 10 is illustrated in a stale mounted in a belt tensioner 12. Said belt tensioner cable guide member 10 differs from the embodiment illustrated in FIGS. 1 through 4 merely by the fact that the first sealing element 44 includes no additional sealing lip 46 but takes a continuously cylindrical and hose-like shape.

In addition, in FIG. 8 the fastening of the inflator 14 and of the pressure chamber 18 on the belt tensioner cable guide member 10 is shown in detail.

The pipe length 16 into which the cartridge-type inflator 14 is inserted as well as the pipe 19 are slipped onto the port 24 and the connecting end 26 until they project from the second and third sealing elements 36, 38 and in this way are seated against the belt tensioner cable guide member 10. Subsequently the pipe length 16 and the pipe 19 are provided with an embossing 50, 52 which is peripheral in the peripheral direction and corresponds to the peripheral recesses 28, 30, said embossing establishing a positive connection to the belt tensioner cable guide member 10.

The pressure chamber 18 is moreover delimited by an end wall 54 of the pipe 19 which covers the support member against the tensioning direction S and includes an opening 56 corresponding to the guide duct 42 through which opening the cable 20 is guided out of the guide duct 42.

The invention claimed is:

1. A belt tensioner cable guide member (10) that connects an inflator (14) to a pressure chamber (18), comprising:
   a guide duct (42) through which a cable (20) of a belt tensioner (12) is guided;
   a pressure duct (40) for fluid communication between the inflator (14) and the pressure chamber (18), the pressure chamber (18) having a displacement body (60) therein, the displacement body (60) being drivable and coupled to the cable (20); and
   a first sealing element (44) provided in the guide duct (42) to enclose the cable (20) in a circumferential direction and seal the guide duct (42) against the cable (20), the first sealing element (44) being fixedly attached to an inner wall of the guide duct (42) by injection molding; wherein
   the belt tensioner cable guide member (10) is a multi-component injection molded part.

2. The belt tensioner cable guide member (10) according to claim 1, including a support member (22) made of a fiber-reinforced plastic material.

3. The belt tensioner cable guide member (10) according to claim 2, wherein the first sealing element (44) is hose-shaped and is made of elastic material.

4. The belt tensioner cable guide member (10) according claim 1, wherein the first sealing element (44) includes at least one sealing lip (46) having a reduced diameter which is provided at an axial end of the first sealing element (44).

5. The belt tensioner cable guide member (10) according to claim 1, including a connecting end (26) for the pressure chamber (18) and a second sealing element (36) at the connecting end (26).

6. The belt tensioner cable guide member (10) according to claim 1, including a port (24) for the inflator (14) to be arranged which is adapted to provide pressurized fluid.

7. The belt tensioner cable guide member (10) according to claim 6, wherein the pressure duct (40) in portions extends in parallel to the guide duct (42).

8. The belt tensioner cable guide member (10) according to claim 6, wherein in the area of the port (24) for the inflator (14) a third sealing element (38) in the form of a seal ring is provided.

9. A belt tensioner (12) for a seat belt in a vehicle comprising the belt tensioner cable guide member (10) according to claim 1, the inflator (14) for providing pressurized fluid, the pressure chamber (18) being in fluid communication with the inflator (14) and being connected to an assigned connecting end (26) of the belt tensioner cable guide member (10) in a sealing manner, and the cable (20)

connected to a displacement body movably supported in the pressure chamber (18) to which displacement body the pressurized fluid can be applied in a tensioning direction (S), wherein the first sealing element (44) seals the guide duct (42) against the cable (20).

10. The belt tensioner (12) according to claim 9, wherein the inflator (14) includes a metal pipe (16) which is mounted on an assigned port (24) at the belt tensioner cable guide member (10).

11. The belt tensioner cable guide member (10) according to claim 1, including a port (24) for the inflator (14) and a connecting end (26) for the pressure chamber (18), an outer surface of the connecting end (26) having a first peripheral groove (32) with a second sealing element (36) for sealing the connecting end (26) against the pressure chamber (18) provided therein, an outer surface of the port (24) having a second peripheral groove (34) with a third sealing element (38) for sealing the port (24) against the inflator (14) provided therein, each of the second and third sealing elements (36, 38) being in the form of a seal ring.

12. The belt tensioner cable guide member (10) according to claim 11, wherein the outer surface of the connecting end (26) has a first recess (28) for mounting the pressure chamber (18) thereto, and the outer surface of the port (24) has a second recess (30) for mounting the inflator (14) thereto, the first recess (28) being adjacent to the first peripheral groove (32) on the outer surface of the connecting end (26), the second recess (30) being adjacent to the second peripheral groove (34) on outer surface of the port (24).

\* \* \* \* \*